(12) United States Patent
Perry et al.

(10) Patent No.: US 7,930,212 B2
(45) Date of Patent: Apr. 19, 2011

(54) ELECTRONIC MENU SYSTEM WITH AUDIO OUTPUT FOR THE VISUALLY IMPAIRED

(76) Inventors: Susan Perry, Miami, FL (US); Richard Herbst, Miami, FL (US)

(*) Notice: Subject to any disclaimer, the term of this patent is extended or adjusted under 35 U.S.C. 154(b) by 283 days.

(21) Appl. No.: 12/059,025

(22) Filed: Mar. 31, 2008

(65) Prior Publication Data

US 2008/0243624 A1 Oct. 2, 2008

Related U.S. Application Data

(60) Provisional application No. 60/920,749, filed on Mar. 29, 2007.

(51) Int. Cl.
*G06Q 30/00* (2006.01)
*G10L 21/06* (2006.01)
*G09G 5/00* (2006.01)

(52) U.S. Cl. ............................ 705/15; 704/271; 345/865

(58) Field of Classification Search ...................... 705/15
See application file for complete search history.

(56) References Cited

U.S. PATENT DOCUMENTS

| | | | |
|---|---|---|---|
| 5,884,262 A * | 3/1999 | Wise et al. | 704/270.1 |
| 5,896,129 A * | 4/1999 | Murphy et al. | 725/76 |
| 5,897,623 A * | 4/1999 | Fein et al. | 705/27 |
| 5,933,812 A * | 8/1999 | Meyer et al. | 705/15 |
| 6,115,482 A | 9/2000 | Sears et al. | |
| 6,324,511 B1 * | 11/2001 | Kiraly et al. | 704/260 |
| 6,459,364 B2 * | 10/2002 | Gupta | 340/407.1 |
| 6,473,739 B1 | 10/2002 | Showghi et al. | |
| 6,496,182 B1 | 12/2002 | Wong et al. | |
| 6,532,005 B1 | 3/2003 | Campbell | |
| 6,542,623 B1 * | 4/2003 | Kahn | 382/114 |
| 6,636,835 B2 * | 10/2003 | Ragsdale-Elliott et al. | 705/15 |
| 6,856,333 B2 * | 2/2005 | Ullmann et al. | 715/865 |
| 6,859,215 B1 * | 2/2005 | Brown et al. | 715/811 |
| 6,995,875 B2 * | 2/2006 | Dow et al. | 358/473 |
| 6,996,777 B2 * | 2/2006 | Hiipakka | 715/727 |
| 6,999,066 B2 * | 2/2006 | Litwiller | 345/173 |

(Continued)

OTHER PUBLICATIONS

Ted Whipp Star Staff Reporter. (Dec. 7, 2002). Talking menus appetizing to visually impaired diners :[Final Edition]. The Windsor Star, p. A4. Retrieved Nov. 19, 2010, from Canadian Newsstand Complete. (Document ID: 289641801).*

(Continued)

*Primary Examiner* — Matthews S Gart
*Assistant Examiner* — Ashford Hayles
(74) *Attorney, Agent, or Firm* — Mark D. Bowen, Esq.; Malin Haley DiMaggio; Bowen & Lhota, P.A.

(57) ABSTRACT

An electronic talking menu system for the visually impaired includes a battery powered portable electronic, audio output device having large back-lighted buttons corresponding to menu items. Each button corresponds to contents of the restaurant's menu, such as appetizers, drinks, seafood, desserts, etc. Pressing a particular button activates a pre-recorded description of the menu item, or menu items within the selected category. An electronic menus system thus provides a system for enabling a visually impaired person to review and select desired menu items using audio feedback. Delivery of pre-recorded content is accomplished via either a logically-managed service wherein formatted sound files are uploaded to a memory card from a personal computer via the Internet, and/or a courier-based service wherein formatted memory cards are delivered to restaurants via a third party parcel delivery service with a round-robin mailer to exchange memory cards.

10 Claims, 10 Drawing Sheets

U.S. PATENT DOCUMENTS

| | | | |
|---|---|---|---|
| 7,024,016 B2 | 4/2006 | Rhoads et al. | |
| 7,026,916 B2 | 4/2006 | Alexander | |
| 7,107,219 B2* | 9/2006 | Nemoto | 704/271 |
| 7,176,898 B2* | 2/2007 | Litwiller | 345/173 |
| 7,200,560 B2* | 4/2007 | Philbert | 704/271 |
| 7,318,195 B2* | 1/2008 | Donahue | 715/702 |
| 7,432,912 B2* | 10/2008 | Cote et al. | 345/169 |
| 7,446,669 B2* | 11/2008 | Liebermann | 340/825.19 |
| 2002/0069046 A1* | 6/2002 | Bress et al. | 704/1 |
| 2003/0018531 A1* | 1/2003 | Mahaffy et al. | 705/16 |
| 2003/0036977 A1 | 2/2003 | Morse | |
| 2003/0071859 A1* | 4/2003 | Takami et al. | 345/865 |
| 2003/0105639 A1* | 6/2003 | Naimpally et al. | 704/276 |
| 2004/0075679 A1* | 4/2004 | Carter et al. | 345/733 |
| 2004/0186713 A1* | 9/2004 | Gomas et al. | 704/235 |
| 2004/0219501 A1* | 11/2004 | Small et al. | 434/317 |
| 2005/0017453 A1* | 1/2005 | Rehbein et al. | 273/299 |
| 2005/0123200 A1* | 6/2005 | Myers et al. | 382/182 |
| 2005/0233287 A1* | 10/2005 | Bulatov et al. | 434/114 |
| 2006/0085265 A1* | 4/2006 | Dietz et al. | 705/15 |
| 2006/0105301 A1* | 5/2006 | Chriss | 434/112 |
| 2006/0247932 A1* | 11/2006 | Yamamoto | 704/270 |
| 2006/0280338 A1* | 12/2006 | Rabb | 382/114 |
| 2007/0035523 A1* | 2/2007 | Cohen | 345/169 |
| 2007/0061209 A1* | 3/2007 | Jackson | 705/15 |
| 2007/0112572 A1* | 5/2007 | Fail et al. | 704/271 |
| 2007/0257889 A1* | 11/2007 | Croy | 345/170 |
| 2008/0084328 A1* | 4/2008 | Crichton | 340/825.19 |
| 2008/0126220 A1* | 5/2008 | Baril et al. | 705/26 |
| 2008/0189114 A1* | 8/2008 | Fail et al. | 704/271 |
| 2008/0268416 A1* | 10/2008 | Wallace et al. | 434/317 |
| 2008/0306790 A1* | 12/2008 | Otto et al. | 705/7 |
| 2009/0192898 A1* | 7/2009 | Baril | 705/14 |

OTHER PUBLICATIONS

Andrew Backover. (May 14, 1999). High-tech contraptions are fast food for thought :[Northeast AM Edition]. Fort Worth Star—Telegram,p. 1. Retrieved Nov. 19, 2010, from Business Dateline. (Document ID: 41625332).*

* cited by examiner

| STEAKS | SEAFOOD | BURGERS | SOUPS & SALADS | APPETIZER |
| --- | --- | --- | --- | --- |
| CARNE | MARISCOS | HAMBURGUESAS | SOPAS Y ENSALADAS | APERATIVOS |
| BEER | SOFT DRINKS | SIDES | RIBS | CHICKEN |
| CERVEZAS | REFRESCOS | ACOMPAÑANTES | COSTILLAS | POLLO |
| ABOUT US | KID'S MENU | SPECIALS | DESSERTS | COCKTAILS |
| EL RESTAURANTE | MENU DE NIÑOS | ESPECIALES | POSTRES | COCTELES |
| SERVICE/SERVICIO | ENGLISH ESPAÑOL | | | |

ELECTRONIC MENU SYSTEM WITH AUDIO OUTPUT FOR THE VISUALLY IMPAIRED

CROSS REFERENCE TO RELATED APPLICATIONS

This application claims the benefit of provisional U.S. Patent Application Ser. No. 60/920,749, filed Mar. 29, 2007.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention broadly relates to the dissemination of information via portable electronic devices adapted for audio output. More particularly, the present invention relates to restaurant menu systems, namely an electronic menu system adapted with audio menu content output for use by the visually impaired in reviewing and selecting desired items in restaurant environments.

2. Description of Related Art

Restaurants generally offer little or no alternatives to patrons uncomfortable with or unable to make use of large, extended printed menus. As a restaurant's offerings increase, their menus grow in depth and complexity to accommodate these changes. Depending on the hours of operation and organization of fare, restaurant menus may be organized to show breakfast, lunch, and dinner, along with specials, prices, and different versions of meals such as senior and children's offerings. Technological limitations, however, have prevented restaurants from presenting menu information to the visually-impaired, or providing any serious alternative to what have become colorful but complex meal catalogs.

Large restaurant chains invest heavily in the media but generally rely almost exclusively on their printed menus to leverage these expenses at the obvious point of purchase, the restaurant dining table. Despite the power of visual presentations, which often include large glossy pictures of meals offered and extensive side menus, conventional printed restaurant menus fail to address the most powerful sensory delivery system, namely audio. It has been found that the spoken word is far more powerful than the printed or written word. Yet restaurants are forced to rely ultimately on the communication skills of the table server to help patrons with questions regarding the menu, ingredients, nutritional information, etc. As a result, there exists need for a menu system capable of generating audio output to provide customers, particularly the visually impaired, with information regarding menu items.

As a result of this recognized need, the background art reveals a number of attempts directed to adapting menu systems with audio output functions in a variety of fields. For example, U.S. Pat. No. 6,473,739, issued to Shoghi et al., discloses a system for enabling patrons at large-scale spectator events at confined venues having identifiable seats to self-order food and drinks using a hand-held wireless communication device. U.S. Pat. No. 6,636,835, issued to Ragsdale-Elliott et al., discloses a wireless maître d' system for providing interactive two-way communication between patrons and restaurant service personnel during restaurant encounters. U.S. Pat. No. 6,859,215, issued to Brown et al., discloses an electronic food menu on a data processing system wherein electronic food menus are specified for particular customers. U.S. Pat. No. 7,026,916, issued to Alexander, discloses a tabletop signaling device for restaurants for visually signaling at least one of a plurality of messages to a waiter or waitress using a plurality of light sources and switches for illuminating vertically spaced panels. The references discussed above fail to address the difficulties experienced by visually impaired customers in the restaurant environment.

The background art further reveals an electronic order and inventory information management system for use by servers. Patent Application Publication No. US 2003/0036977, in the name of Morse, discloses an order and inventory management system wherein remote, portable data entry terminals having a display and input buttons enables a waiter to transmit orders to a remote host computer via wireless means whereby the order is routed to respective food and drink terminals for fulfillment and to a billing terminal for bill printing.

In addition, the background art reveals other attempts directed to assisting visually impaired users in the operation of office equipment and the like. U.S. Pat. No. 6,496,182, issued to Wong, discloses enablement of a visually impaired user to use a touch-sensitive device. Objects are announced as the user drags his/her finger across the screen. This reference is particularly directed to operation of electronic devices, such as a copy and facsimile machine. U.S. Pat. No. 6,532,005, issued to Campbell, discloses an audio positioning mechanism for a display assigning each position on the display with an audio signal that allows the user to identify positions on the display by hearing to allow the user to control operations of an electronic device. Similarly, U.S. Pat. No. 6,999,066, issued to Litwiller, discloses a system for audible feedback for touchscreen displays by which a visually impaired worker is able to navigate menu options on touch screen displays. Finally, Patent Application Publication No. US 2003/0071859, in the name of Takami et alt discloses a user interface that allows the visually impaired to operate multifunction devices. The device includes Braille for tactile feedback and voice message output capability. When a number is inputted via the buttonpad, the voice message is outputted to provide the corresponding function area name and helpful description of the function represented by the touch panel area.

None of the above-referenced disclosures adequately address the problems encountered by the visually impaired when attempting to review and order items from a restaurant menu; nor do the disclosures deliver a diverse and full range of electronic input and output functions to assist users (whether visually impaired or not). Accordingly, there exists a need in the art for further advancements in the dissemination of information via portable electronic devices adapted for audio output. There further exists a specific need for further advancements directed to dissemination of information to the visually impaired when ordering in restaurant and other retail environments.

BRIEF SUMMARY OF THE INVENTION

The present invention overcomes the limitations and disadvantages present in the art by providing a system adapted for the dissemination of audio information via portable electronic devices. In accordance with a preferred embodiment of the present invention a talking menu system designed for use in restaurant environments by the visually impaired is provided. The menu system includes a battery powered portable electronic device having large back-lighted buttons corresponding to restaurant menu items generally disposed on the front thereof. An interchangeable faceplate is removably disposed in covering relation with the buttons. The faceplate is adapted to assist the user in locating the buttons by tactile sensation, and preferably includes Braille characters that provide information corresponding to each button. Each button corresponds to categorical contents of the restaurant's menu, such as appetizers, drinks, seafood, desserts, etc., or device functions (e.g. volume control, call for service etc.). User actuation of a menu-related button generates audio output, namely a pre-recorded description of the menu item or menu items within the selected category. The present invention thus provides a system for enabling a visually impaired person to review desired menu items using audio signals. The present invention further contemplates delivery and updating of pre-recorded system content via two independent methods, including a feature wherein formatted sound files are uploaded to a memory card or from a personal computer via the Internet using a USB or wireless link, and a courier-based service wherein formatted memory cards are delivered to restaurants via a third party parcel delivery service with a round-robin mailer to exchange memory cards.

Alternate embodiments and features include the following. Radio frequency ("RF") capabilities using radio frequency signals that enable the system to communicate such that customers may be alerted of service readiness and wait staff may be notified of customers requiring service. Irfra red ("IR") features employed as a data switch that notifies the system to alter the sound files or language in response to an IR signal such that the present invention may be adapted to function as a virtual tour guide in a museum. In addition, the present invention contemplates the use of high-density data storage that allows the system to function as a "talking book." Furthermore, hybrid systems adapted to provide video output for use an interface by sighted individuals are contemplated. And text-to-speech ("TTS") embodiments where TTS quality speech is used as an alternative to recorded human speech thereby providing instantaneous voice generation using database applications as a source.

Accordingly, it is an object of the present invention to provide a talking menu system for use by the visually impaired.

Another object of the present invention is to provide such a system based on portable battery powered electronic devices.

Still another object of the present invention is to provide such a system wherein the electronic devices include large lighted buttons corresponding to menu categories and featured menu items.

Yet another object of the present invention is to provide such as system wherein content may be efficiently modified by manual delivery of memory cards or electronic delivery via the Internet.

In accordance with these and other objects, which will become apparent hereinafter, the instant invention will now be described with particular reference to the accompanying drawings.

DETAILED DESCRIPTION OF THE INVENTION

Figure 1:
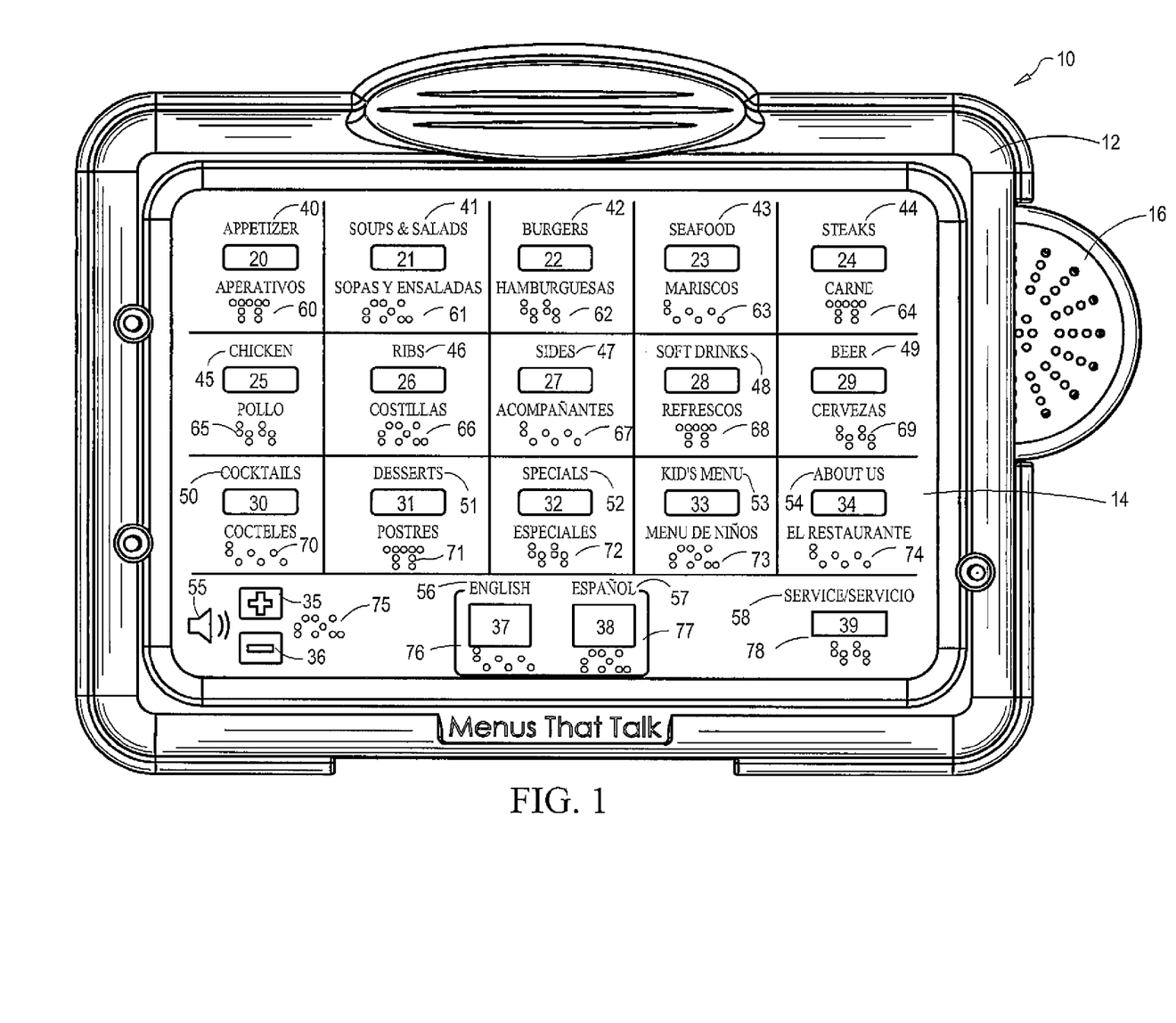
FIG. 1 is a front illustration view of an electronic menu adapted with audio output in accordance with the present invention.
Figure 2:
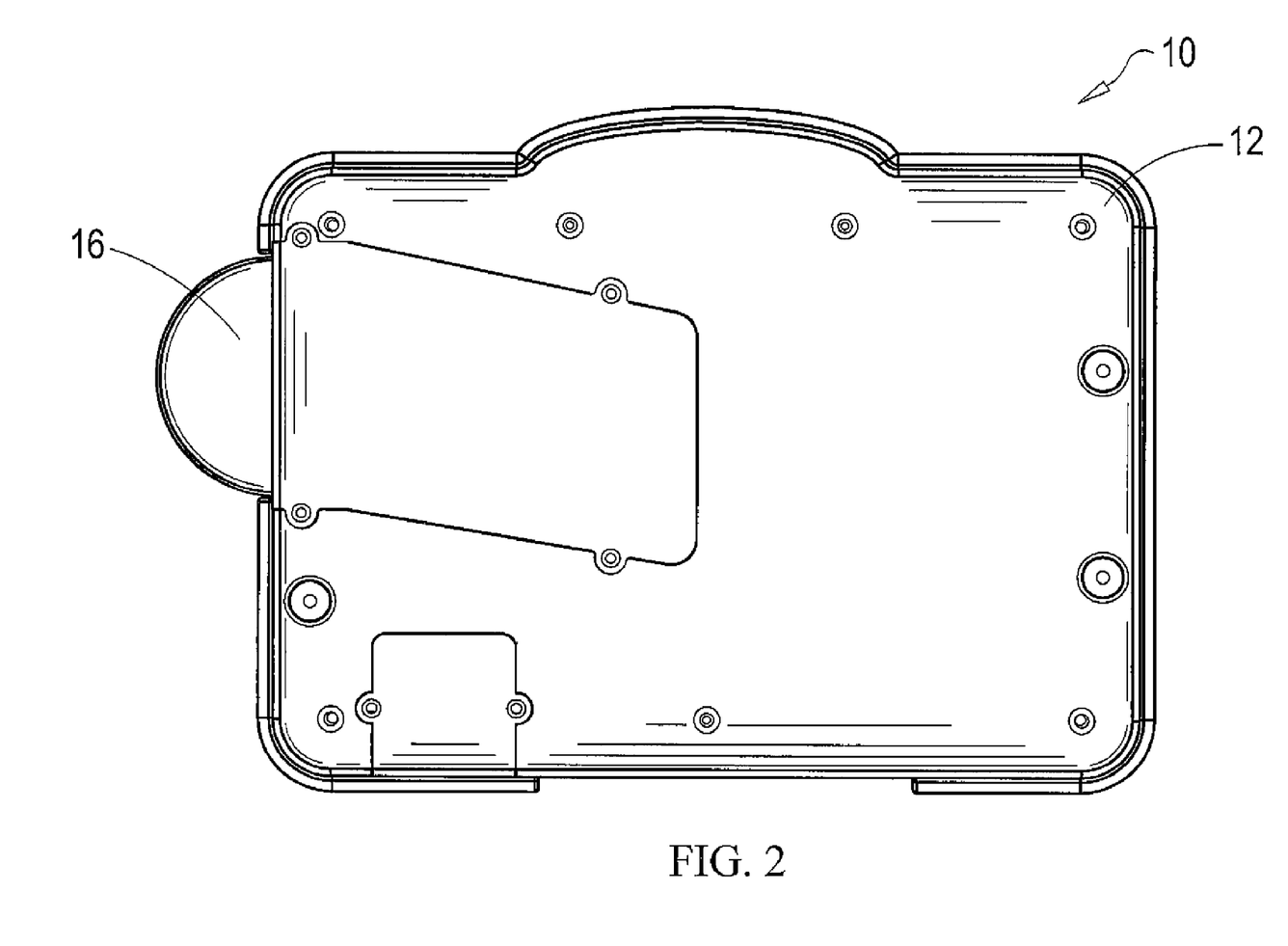
FIG. 2 is a rear view thereof
Figure 3:
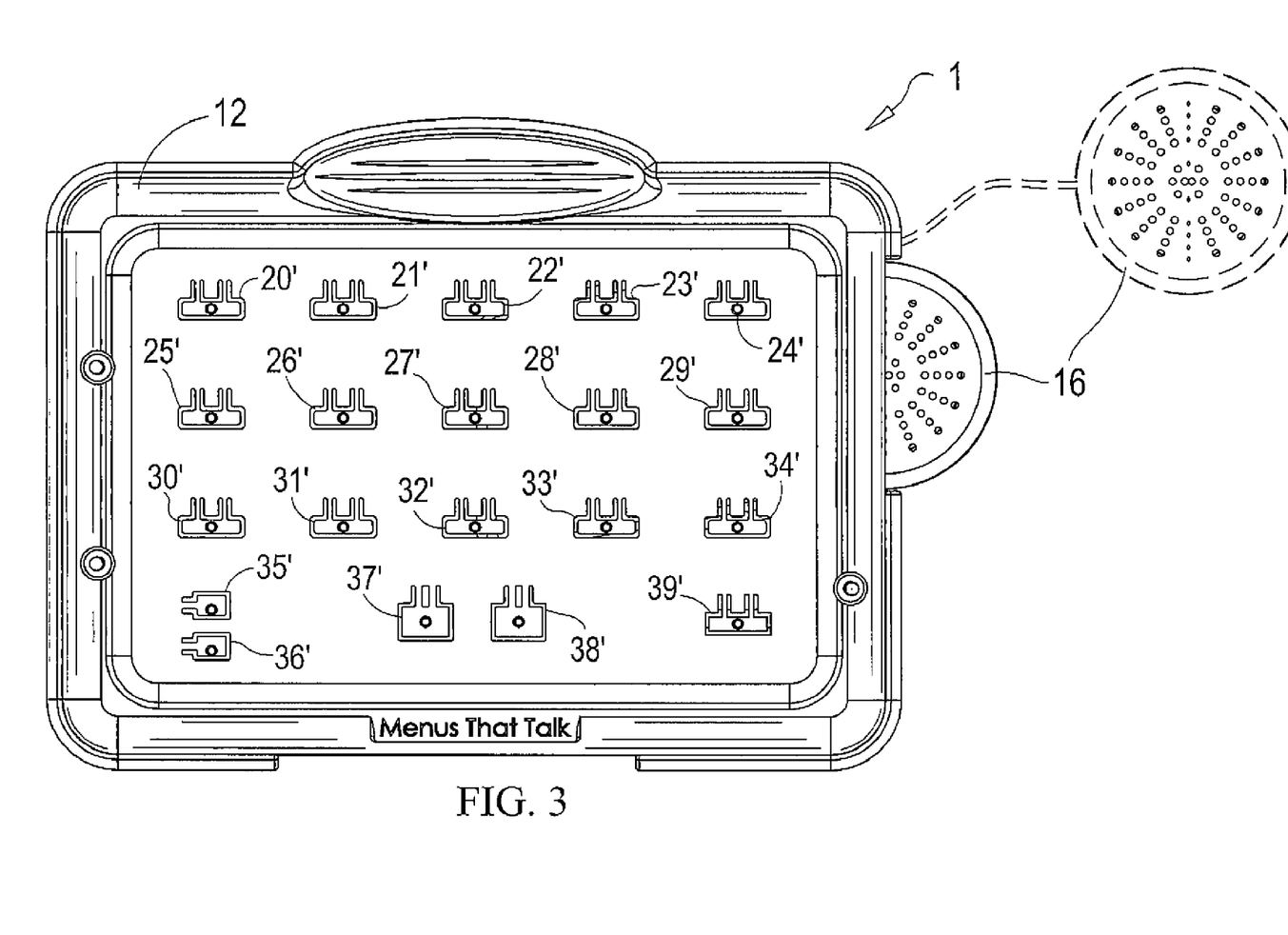
FIG. 3 is a front view thereof with the faceplate removed.
Figure 4:
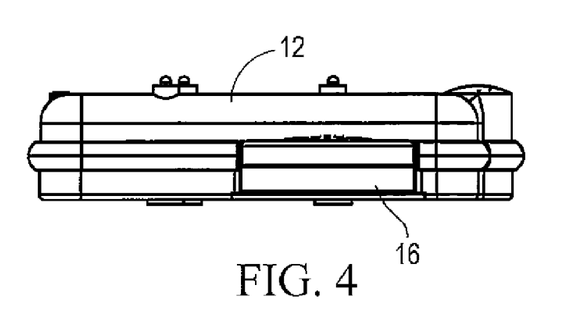
FIG. 4 is right side view thereof.
Figure 5:
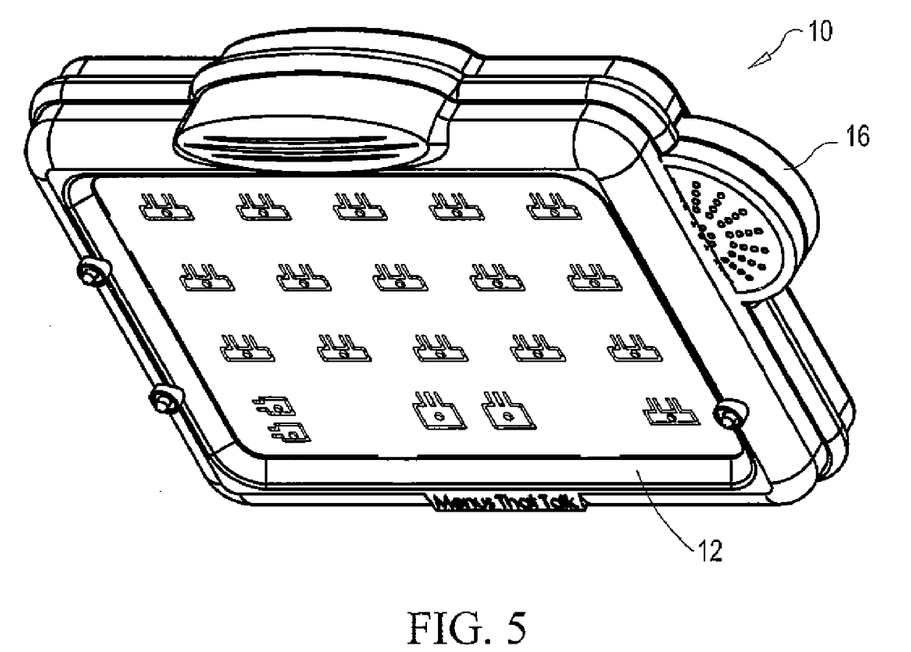
FIG. 5 is a front perspective view thereof.

With reference to the drawings, FIGS. 1-12 depict preferred embodiment of a portable electronic device and system, generally referenced as 10, adapted for the dissemination of audio information in accordance with the present invention. As best seen in FIG. 1, electronic device 10 comprises a battery powered, portable electronic device having a housing 12, adapted with large back-lighted front adapted with a plurality of manually actuated input keys, such as buttons referenced as 20-39. Buttons 20-39 correspond to various menu items or other functions as more fully discussed herein. In addition, buttons 20-39 are also individually illuminated, such as by a light emitting device ("LED") or other light source suitable for particularly illuminating each individual button thereby assisting the user by providing visual indication of button location. The present invention further provides at least one removable faceplate insert, referenced as 14, removably attached to housing 12 in covering relation with buttons 20-39. Faceplate 14 contains Braille characters and indicia corresponding to menu items and the like to allow visually impaired users to navigate the restaurant menu.

FIGS. 2-5 depict various views of the housing 12 for an electronic menu system device 10 in accordance with the present invention. Housing 12 contains the necessary electronics and rechargeable battery power source required for operation, and is preferably fabricated from molded plastic and is otherwise engineered to be impact resistant. Device 10 includes a speaker 16 partially removably received within a speaker holding compartment defined within housing 12. Speaker 16 is preferably in electrical communication with audio output electronics contained within housing 12 by a cable such that the speaker may be selectively removed and spaced from housing 12 for placement in proximity to the user's ear. In alternate embodiments, speaker 16 may receive output signals from device 10 via wireless transmission thereby eliminating the need for a cable. This feature is particularly important as the present may be used in loud environments, such as a crowded restaurant or bar. As noted above, speaker 16 is preferably only partially received within housing 12 in a stored configuration such that a portion of speaker 16 projects from the housing thereby enabling quality audio output even when not removed.

FIGS. 6-9 depict various views of a preferred embodiment of a faceplate insert 14 for use with housing 12 in accordance with the present invention. Faceplate 14 is preferably fabricated from a generally thin flexible plastic sheet material and includes a plurality of sections 15 generally arranged in a grid, with each section corresponding to one or more buttons 20-39 on housing 12. In a preferred embodiment the upper portion of faceplate 14 is arranged in a (5×3) grid (e.g. 5 columns×3 rows) with buttons corresponding to menu and restaurant information, and a lower portion generally arranged with buttons for use in system operation. For simplicity of reference, reference numbers 20-39 generally identify button related structure on faceplate 14, and reference numbers 20'-39' identify the actual buttons on housing 12. Providing a removable faceplate facilitates modifying menu items or other information as well as shielding the underlying buttons while providing a surface that is easily cleanable. As should be apparent, buttons 20-39 may be individually actuated by pressing on the corresponding faceplate section. In the embodiment illustrated in FIG. 1 adapted with the faceplate 14 shown in FIGS. 6-9, a number of the buttons, namely buttons 20-34, correspond to a menu item or menu grouping. These buttons are electronically configured to activate output of a digital audio file, stored on a memory storage device such as an interchangeable memory card, corresponding to a particular menu item or group of menu items. The present invention thus transforms a formatted printed menu into an easily-navigable audio menu through the use of embedded digital audio files.

Figure 6:
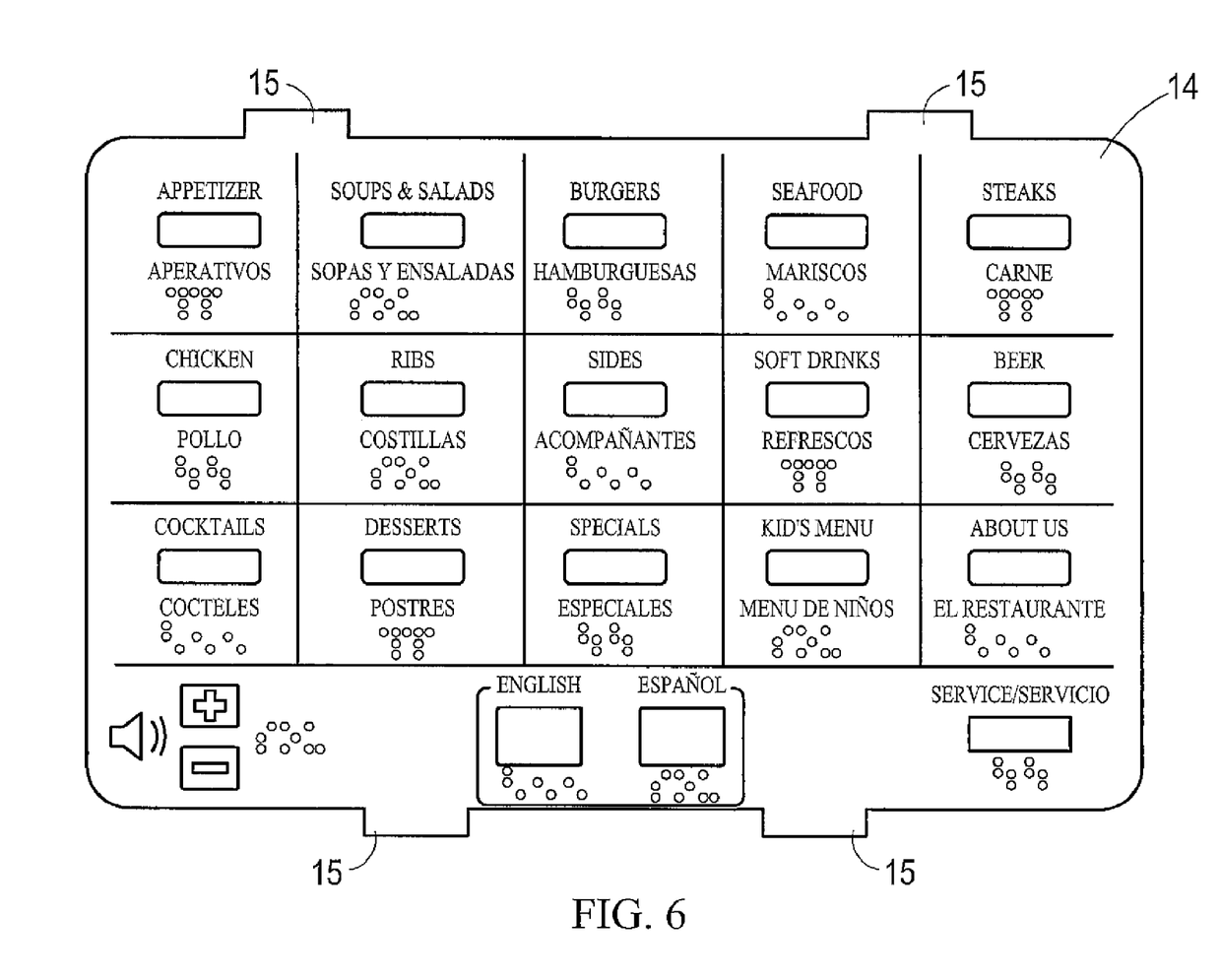
FIG. 6 is a front view of a faceplate insert.
Figure 7:
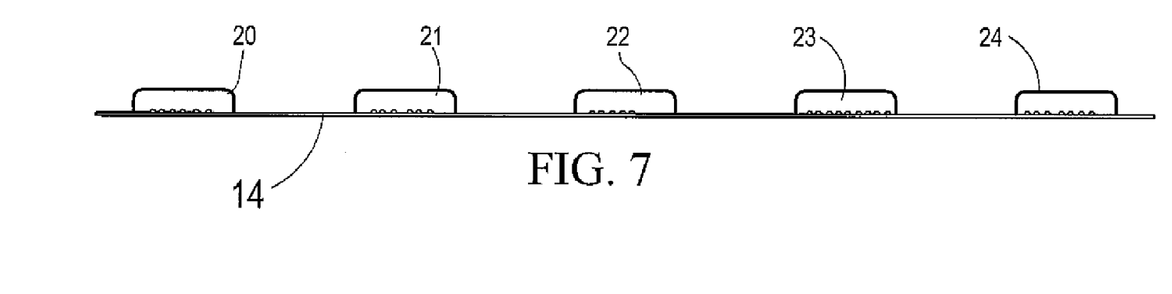
FIG. 7 is a top view thereof.
Figure 8:
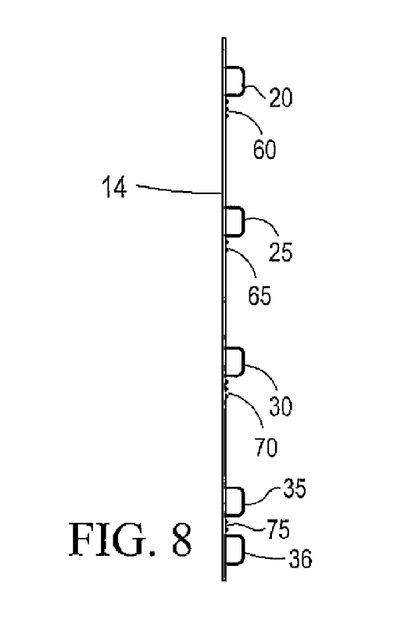
FIG. 8 is a side view thereof.
Figure 9:
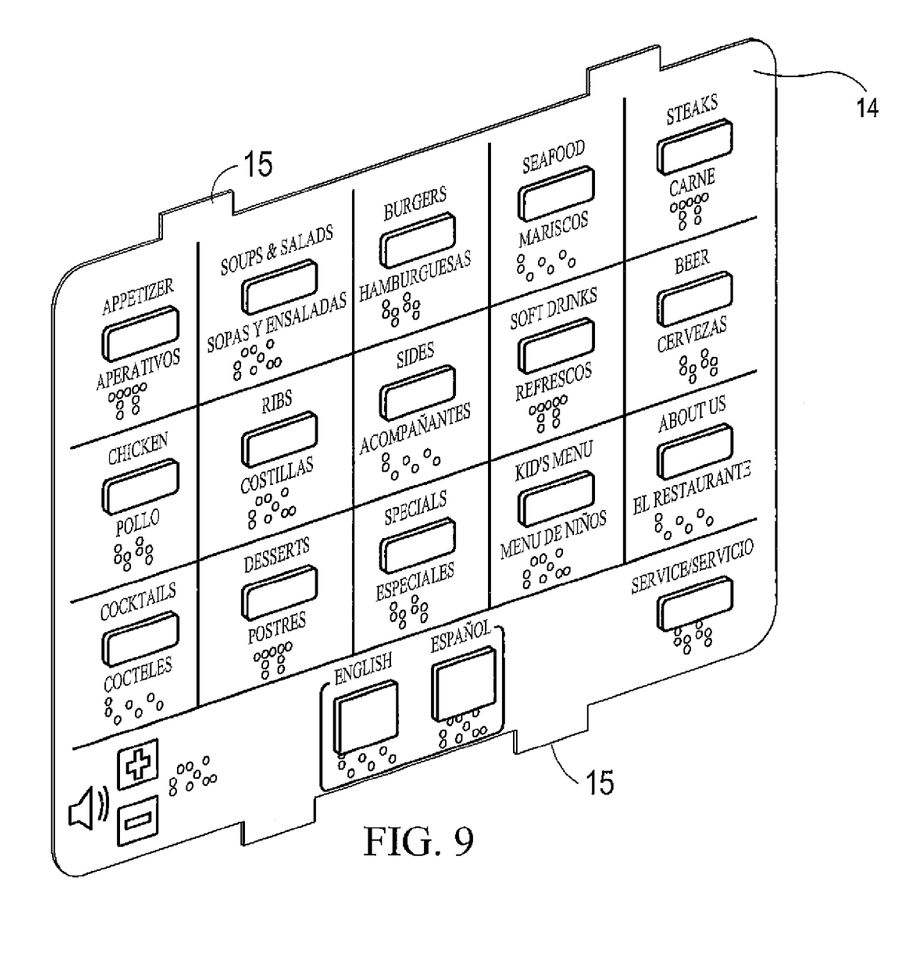
FIG. 9 is a perspective view thereof.

FIGS. 6-9 depict a faceplate 14 adapted for use in a restaurant. As noted above, faceplate 14 is adapted for removable attachment to housing 12 in covering relation with the front portion thereof, and particularly housing buttons 20-39. Faceplate 14 may be removably secured to housing 12 in engagement of projecting tabs 15 with corresponding housing structure, or by any other suitable means of removable attachment. As noted above, faceplate 14 is divided into various sections, each section corresponding to one or more faceplate button functions. As best seen in FIGS. 6-8, faceplate 14 defines a number of buttons 20-39 by providing a raised or embossed structure that allows the user to locate each button by tactile sensation of the raised structure. In the preferred embodiment depicted in FIGS. 6-8, the embossed structure comprises a raised generally rectangular structure that identifies the button location to the user. Faceplate 14 further includes alphanumeric and/or graphic indicia, referenced as 40-58, that describes or identifies the information content or functionality of the corresponding button. Indicia 40-58 are preferably disposed on insert 14 and positioned in close proximity to each corresponding button, such as directly above and/or below the button, as seen in FIG. 1. In the faceplate embodiment depicted in FIG. 6, the descriptive indicia comprises an English language word or phrase disposed above the button and the corresponding Spanish language word or phrase disposed below the button. For example button 20 includes the word "Appetizers" referenced as 40 above the button and the word "Aperativos" below the button. A further significant aspect of the present invention includes providing each button with Braille characters, referenced as 60-78, that also describe or identify the information content of functionality of the corresponding button. Braille characters 40-78 are preferably formed on insert 14 as raised protrusions, with each disposed in close proximity to a corresponding button. Braille characters 40-78 may "spell" or otherwise indicate the category name (e.g. "Appetizers") and/or an equivalent section identification code (e.g. 1, 2, 3 . . . etc.). In an alternate embodiment, a folding and/or reversible faceplate insert that provides indicia and/or Braille characters in two different languages is contemplated.

As note above, electronic menu system 10, and particularly housing 12 includes an audio speaker 16 for generating audio output. Audio output is generated by internal electronic circuitry, processor(s), and data storage hardware electrically connected to buttons 20-39. An optional ear-piece or light-weight headset may be provided in environments wherein it is desirable to maintain minimum noise levels. FIG. 1 illustrates an embodiment incorporating a detachable speaker 16 connected to housing 12 by a length of cable. When a user presses a particular button the electronics are activated to generate a pre-recorded audio description of the menu item, or menu items within the selected category. For example, activating button 20, identified by indicia 40, namely "Appetizers", and further identified by Braille characters 60 corresponding to the word "Appetizers", results in an audio output that provides information about the various appetizers available. The present invention thus provides a system for enabling a visually impaired person to review and select desired menu items using audio feedback.

A further significant aspect of the present invention involves use of the electro-magnetic frequency (EMF) generated by speaker 16 to provide an automatic electromagnetic interface with modern healing aids. In accordance with this aspect, EMF generated by speaker 16 interacts the user's hearing aid when the user places the speaker in proximity to the hearing aid. The user is thus able to detach speaker 16 and position it next to his or her hearing aid assisted ear whereby the EMF generated by speaker 16 functions to induce amplification of generated sound via the user's hearing aid.

Electronic menu 10 further includes volume control buttons 35 and 36 corresponding to volume increase and decrease functions. Those functions are further represented by graphic symbol 55 and corresponding Braille characters 75. In addition, electronic menu 10 is preferably adapted for use in multiple languages. Accordingly, buttons 37 and 38 function to select the language for audio output. In the preferred embodiment depicted in FIG. 1, electronic menu 10 is adapted to generate audio output in English (identified by indicia 56) by activation of button 37, or Spanish (identified by indicia 57, i.e. "Espanol") by activation of button 38. Yet another function incorporated into electronic menu 10 is a service call feature. More particularly, activation of button 39 functions as a server call button with activation thereof functioning to illuminate a call light disposed on housing 12.

Figure 12:
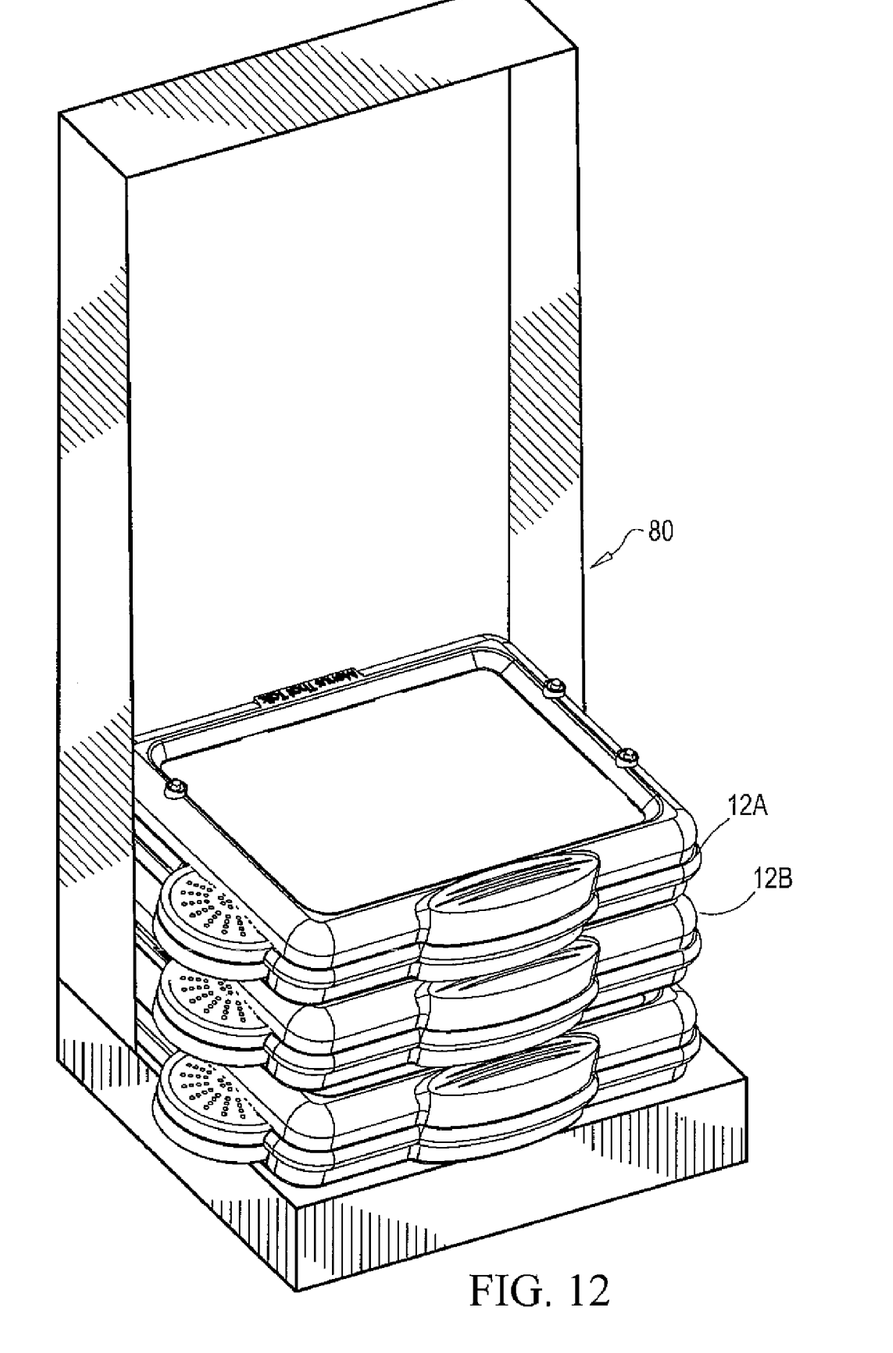
FIG. 12 is a perspective view of a charging stand for use in recharging a plurality of electronic devices in accordance with the present invention.

A rechargeable battery power source provides electrical power for the device. In a preferred embodiment, power is supplied by an internal Lithium ion battery capable of delivering 6-8 hours of continuous operation. FIG. 12 depicts a charging stand 80 adapted for receiving a plurality of devices, referenced as 10A and 10B, for simultaneous storage and charging. To further maximize battery life electronic menu 10 is adapted with to automatically enter a "sleep mode" when not in use thereby extending between-charge operation. The housing may further include a status light for displaying the charge condition of the unit.

Audio content is custom recorded for restaurants and preferably stored on a small capacity (64 MB) storage card (SD-card), of the type found in widespread use for storing images taken by digital cameras. Housing 12 is adapted with a secure access door to facilitate removal and replacement of storage cards only by authorized persons, such as restaurant employees. It should be noted, however, that alternate data storage systems, including smart cards and compact flash memory devices, optical data storage systems, and large capacity data storage systems, may be employed and are considered within the scope of the present invention.

Figure 10:
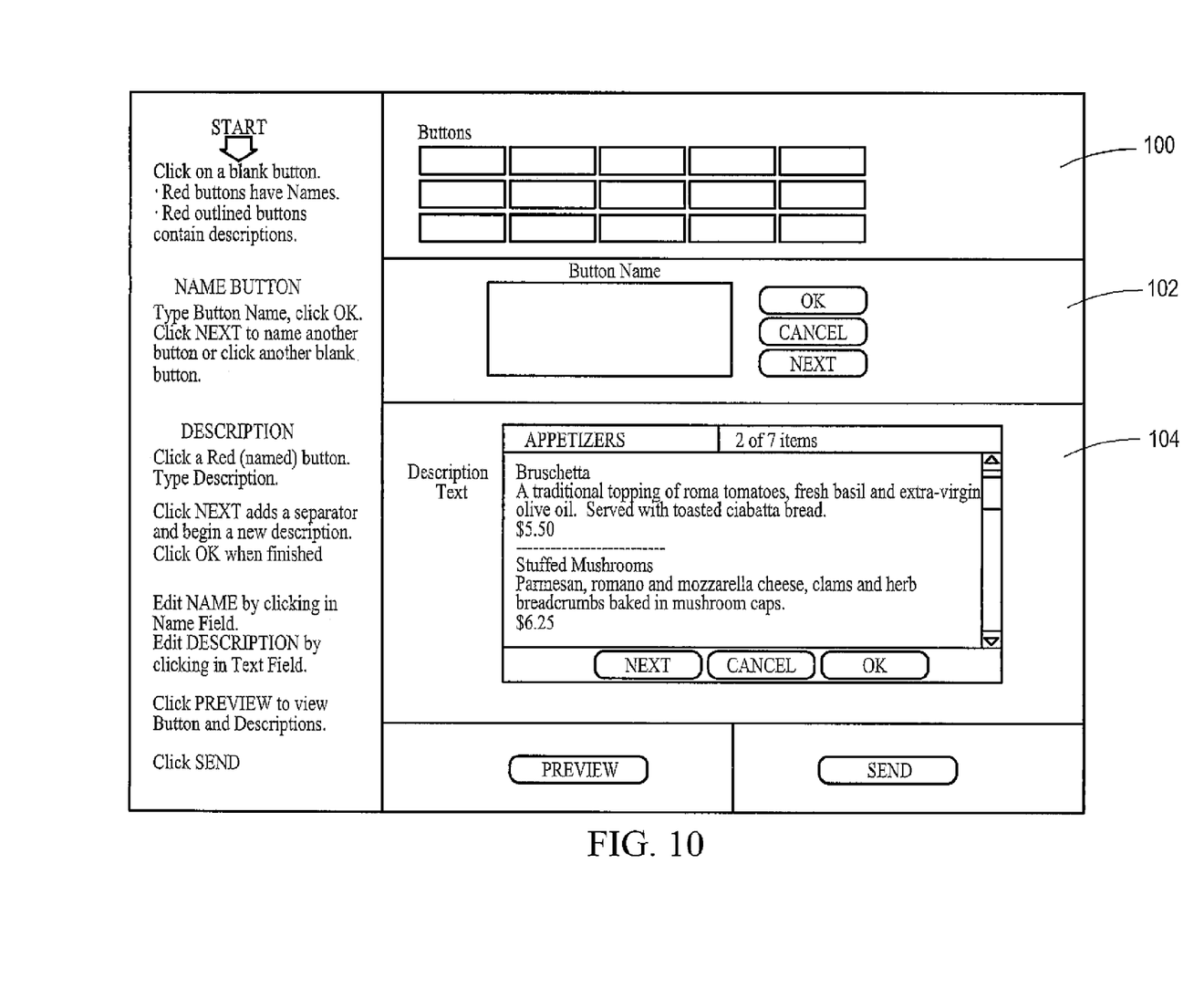
FIG. 10 is a screen shot illustrating a software display for programming and changing menu content for an electronic menu in accordance with the present invention.
Figure 11:
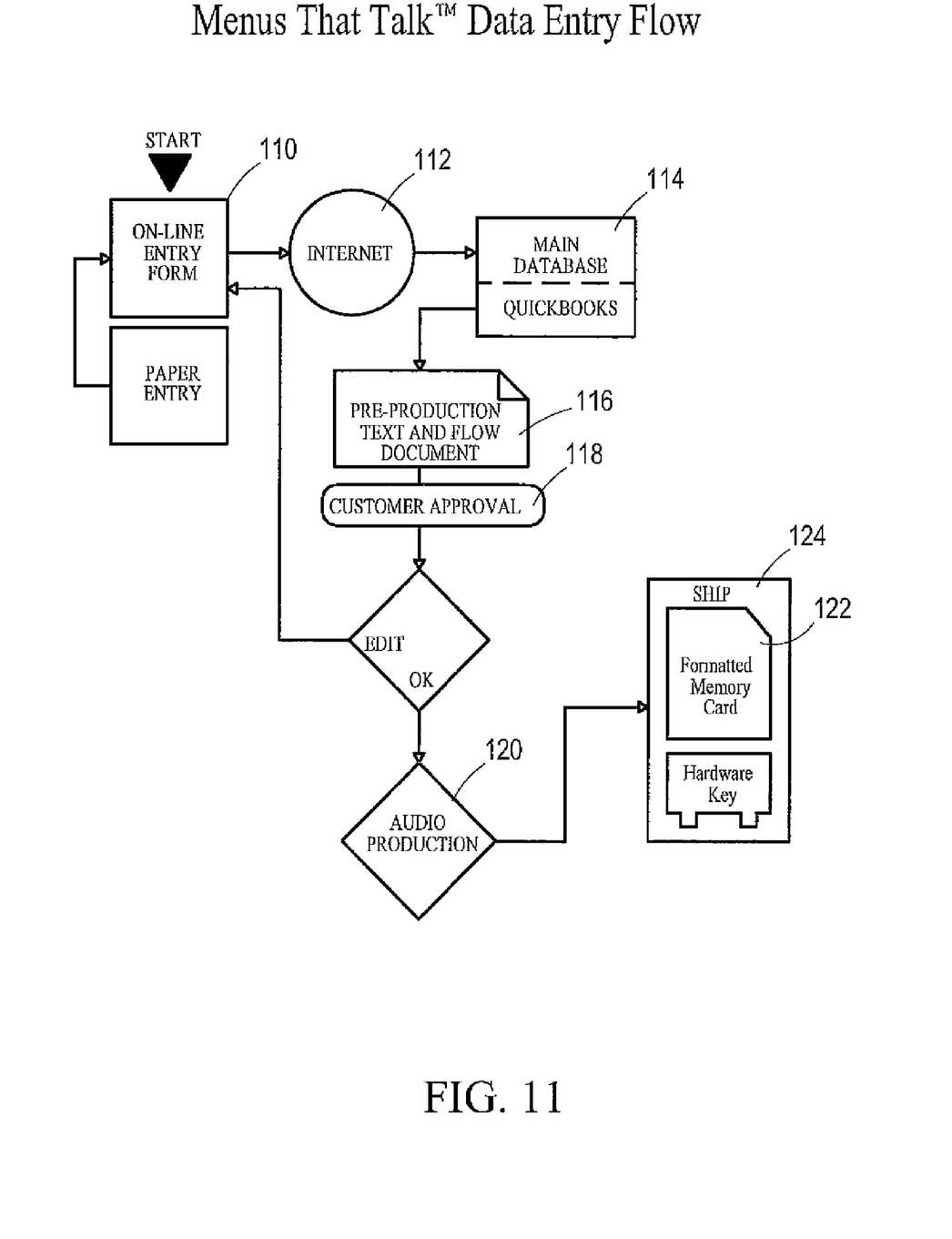
FIG. 11 is a flow chart illustrating data entry flow for programming an electronic menu in accordance with the present invention.

The present invention further contemplates delivery of pre-recorded content via alternate and independent methods, including a logically-managed service wherein formatted sound files are uploaded to a memory card from a personal computer via the Internet, and a courier-based service wherein formatted memory cards are delivered to restaurants via a third party parcel delivery service with a round-robin mailer to exchange memory cards. FIG. 10 is a screen display illustrating the use of software to adapted to modify information corresponding to the various buttons. As best seen in FIG. 10, each button on the electronic menu device 10 is represented in the top field, referenced as 100, of the display. Clicking on a particular button allows the user to modify the name and content associated with that button using fields 102 and 104. More particularly, field 102 allows the user to change the name associated with the button (e.g. change "Appetizer" to "Wine"). Field 104 provides for amending the description and text associated with the button name. FIG. 11 is a flow chart illustrating the entry of data 110, uploading of the entered data to a main database 114 via the Internet 112, production 116, approval 118, audio production 120, storage 122, and shipping phases 124.

A further contemplated alternate embodiment comprises substituting a touch-sensitive display screen for the buttons and face plate structure disclosed above. In accordance with this embodiment, the device is adapted with a touch-sensitive display screen (such as an LCD) wherein the buttons are graphically displayed along with text (in any suitable language of symbology) to provide a device that may be programmed for use by the non-visually impaired in virtually any language, whether text based of symbol based. A suitable technology for this embodiment has been developed by XEROX, and is identified as E-INK. In a preferred alternate embodiment, a color LCD (or plasma) display is used to provide a low power-consuming screen that may display menu options in a language selected by the user. The device will have the ability to store menu options and information in a wide variety of languages thereby allowing the user to select a desired language of his or her choosing with the touch of a button, without requiring specialized configuration. When adapted in accordance with this particular embodiment, the present invention may thus be used at events and locations wherein a diverse population is present, such as the Olympics, and other major or international events or venues.

The present invention further contemplates being adapted with a wireless capability such that will interface with a local area network at the restaurant site to permit real time menu changes transmitted to the devices 10 via wireless communication. In this embodiment, menu content may be updated and modified using a proprietary wireless router that senses and activates menus (e.g. lunch menu, dinner menu, etc.), each of which has an assigned ID, and automatically installs updated audio files to the electronic menu via wireless communication. Adapting the system with wireless communication further enables additional functions, such as to permit customers to place an order directly from the device. Still other contemplated functions include the ability to adapt the device such that the customer is able to pay using a credit or debit card.

Additional contemplated embodiments, uses, and features include the following. The incorporation of radio frequency ("RF") capabilities into device 10 is contemplated. In accordance with this embodiment, the device electronics are adapted to include a digital signal processor ("DSP") capable of transmitting and receiving data using signals transmitted via radio frequencies, such as the 700-900 MHz range of public communication signals designated by the FCC for use by paging devices, short-range duplex systems, alarms, and the like. It is contemplated that the present invention would incorporate RF communication capabilities so as to enable operation as a "duplex pager" using radio frequency signals that enable the system to communicate whereby customers may be alerted of service readiness by receipt of a signal, and/or wait staff may be notified of customers requiring service by transmission of a signal. In accordance with this embodiment device 10 may further be adapted with an illuminated beacon, and/or mechanics adapted to generate a vibration alert. This duplex feature employs a small transceiver controlled entirely by software which can both deliver alert signals as well as provide a data transfer platform. A further example of the incoming data benefit of the RF enabled embodiment involves the updating and changing of internally stored sound files to provide a restaurant with a means of rapidly and remotely changing menu content via wireless communication. An example of outgoing data benefit of this alternate embodiment is the ability to send selected or parsed menu items to a nearby printer or personal computer, effectively allowing the device 10 to function as an order entry device. This protocol typically operates at 300, 400 and 800 MHz, at typically 250 Mbps.

In yet another alternate embodiment, identified as IR zoning, the system is adapted with infra red ("IR") features that enable the device to generate selected sound files in response to a received IR signal. In this embodiment the IR feature is employed as a data switch to instruct the system to alter the sound files. When adapted with the IR feature the present invention provides a portable electronic device that can function as an electronic tour guide in a museum. In accordance with this embodiment, small IR beacons, which may be ceiling mounted and are similar to the IR emitter in a TV remote control, notify the device of its new geographic location directing it to switch to audio content appropriate for the area or zone. For example, when the device is carried into a first zone (e.g. room or area) an IR beacon in that zone transmits a signal that is received by the device thereby informing the device of its current zone location which information is used to determine the appropriate audio files to be generated as output. Once the device is carried into a second zone, the signal received by the second zone JR beacon informs the device to again determine the appropriate audio files to be generated as output. As should be apparent, the device may thus be adapted for a wide variety of information processing uses above and beyond use in restaurant environments.

The use of larger/high-density data storage that allows the system to function store sufficient information to be able to function as a "talking book." As disclosed above, the system is further capable of operating in virtually any language. The ability to provide audio output in multiple languages provides mass appeal. In accordance with this embodiment, buttons 37 and 38 may be adapted to function in a scrolling mode wherein the user is able to select a desired language from a menu of many languages by simply scrolling by "Next" or "Last" language selected. A further contemplated alternate embodiment, identified as a "hybrid" system is adapted to provide video output for use an interface by sighted individuals. In addition, text-to-speech ("TTS") embodiments where TTS quality speech is used as an alternative to recorded human speech are contemplated. The use of TTS quality speech in lieu of actual pre-recorded human speech allows for instantaneous voice generation using database applications as a source as the authoring of TTS voice content can be as simple as keyboard text input.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An electronic restaurant menu system for providing audio information regarding menu items, said menu system comprising: a portable electronic device having a housing;
   a battery power source contained within said housing; a computer processor in electrical communication with said power source;
   means for storing data including a plurality of audio files in electrical communication with said computer processor, said audio files comprising information relating to restaurant menu options;
   a speaker in electrical communication with said computer processor to provide audio output;
   said housing including a plurality of manually actuated buttons;
   means for individually illuminating each of said manually actuated buttons;
   a faceplate removably attached to said housing in covering relation with said plurality of manually actuated buttons, said faceplate including embossed structure corresponding to each of said buttons to allow the user to locate said buttons by tactile sensation; and
   said faceplate including indicia corresponding to each of said buttons, said indicia including text identifying information corresponding to each button.

2. An electronic restaurant menu system according to claim 1, wherein said means for storing data includes a data storage card in removable engagement with said electronic device.

3. An electronic restaurant menu system according to claim 1, wherein said speaker is configurable between first and second configurations while remaining in electrical communication with said computer processor, in said first configuration said speaker is supported by said housing, and in said second configuration said speaker is extended from the housing by the user.

4. An electronic restaurant menu system according to claim 1, wherein each of said buttons includes Braille characters for providing alpha-numeric information relating to each button.

5. An electronic restaurant menu system for providing audio information regarding menu items, said menu system comprising:
   a portable electronic device having a housing, said housing including a front;
   a battery power source contained within said housing;
   a computer processor in electrical communication with said power source;
   means for storing data in electrical communication with said computer processor, said data including audio files comprising information relating to restaurant menu options;
   a speaker in electrical communication with said computer processor;
   said speaker is configurable between first and second configurations while remaining in electrical communication with said computer processor, in said first configuration said speaker is supported by said housing, and in said second configuration said speaker is extended from the housing by the user;
   a plurality of manually actuated input buttons disposed on the front of said housing, each of said buttons in electrical communication with said computer processor and configured to activate at least one of said audio files upon actuation whereby information relating to restaurant menu options is provided as audio output by said speaker;
   means for individually illuminating each of said plurality of manually actuated buttons; and
   a faceplate removably attached to said housing in covering relation with said front, said faceplate including indicia and embossed structure corresponding to each of said buttons, said indicia including text identifying menu related information corresponding to the button, said embossed structure including Braille characters.

6. An electronic restaurant menu system according to claim 5, wherein said embossed structure further includes a raised surface disposed in aligned overlay relation with each of said buttons to allow the user to identify button locations by tactile sensation.

7. An electronic restaurant menu system according to claim 5, further including means for selecting output language from among at least two languages.

8. An electronic restaurant menu system according to claim 5, wherein said faceplate indicia includes text identifying menu related information corresponding to each button in two languages.

9. An electronic restaurant menu system according to claim 7, further including a digital signal processor capable of wirelessly transmitting and receiving data using radio frequency signals.

10. An electronic restaurant menu system according to claim 5, further including a charging station configured to removably receive a plurality of said portable electronic devices, said charging station provided with electrical power and configured to recharge the battery power sources of each device stored in said charging station.

* * * * *